United States Patent [19]

Bridges

[11] Patent Number: 4,672,508
[45] Date of Patent: Jun. 9, 1987

[54] MOUNTING RAIL

[76] Inventor: Denis R. Bridges, 505 Grand Junction Rd., Wingfield SA 5013, Australia

[21] Appl. No.: 728,746

[22] Filed: Apr. 30, 1985

[30] Foreign Application Priority Data

May 2, 1984 [AU] Australia ............................. PG4788

[51] Int. Cl.4 ............................................. H02B 1/04
[52] U.S. Cl. .................................. 361/353; 361/363; 361/376; 248/225.1
[58] Field of Search ............... 361/346, 353, 354, 355, 361/358, 361, 363, 376; 248/225.1, 225.2

[56] References Cited

U.S. PATENT DOCUMENTS 4,536,823  8/1985  Ingram et al. ....................... 361/376

FOREIGN PATENT DOCUMENTS 3025129  1/1982  Fed. Rep. of Germany ...... 361/376
1288991  12/1962  France ................................. 361/376
2029109  3/1980  United Kingdom ................ 361/376

OTHER PUBLICATIONS

Brochure: "Weber Current Limiting Miniature Circuit Breaker (mcb) Series AS 168".
Brochure: "BBC Brown Bover KNS System, Combinable Low-Voltage Switchgear System"-Publication No. DIL 80912E.
Catalog: "Multi 9 Catalogue", Jan. 1982.

Primary Examiner—Roy N. Envall, Jr.
Assistant Examiner—Gregory D. Thompson
Attorney, Agent, or Firm—Brown, Martin, Haller & Meador

[57] ABSTRACT

A mounting rail for electrical components comprises a base having parallel upstanding flanges thereon each containing a plurality of apertures, one of the upstanding flanges having a return portion, and the apertures in the flanges being transversely aligned. A latch strip engages in a pair of the transversely aligned apertures in respective flanges, the latch strip having an out-turned retaining lip which is engageable with a mounting surface at one end of an electrical component when a mounting surface at the other end of the component engages the flange return portion of the upstanding flange.

6 Claims, 6 Drawing Figures

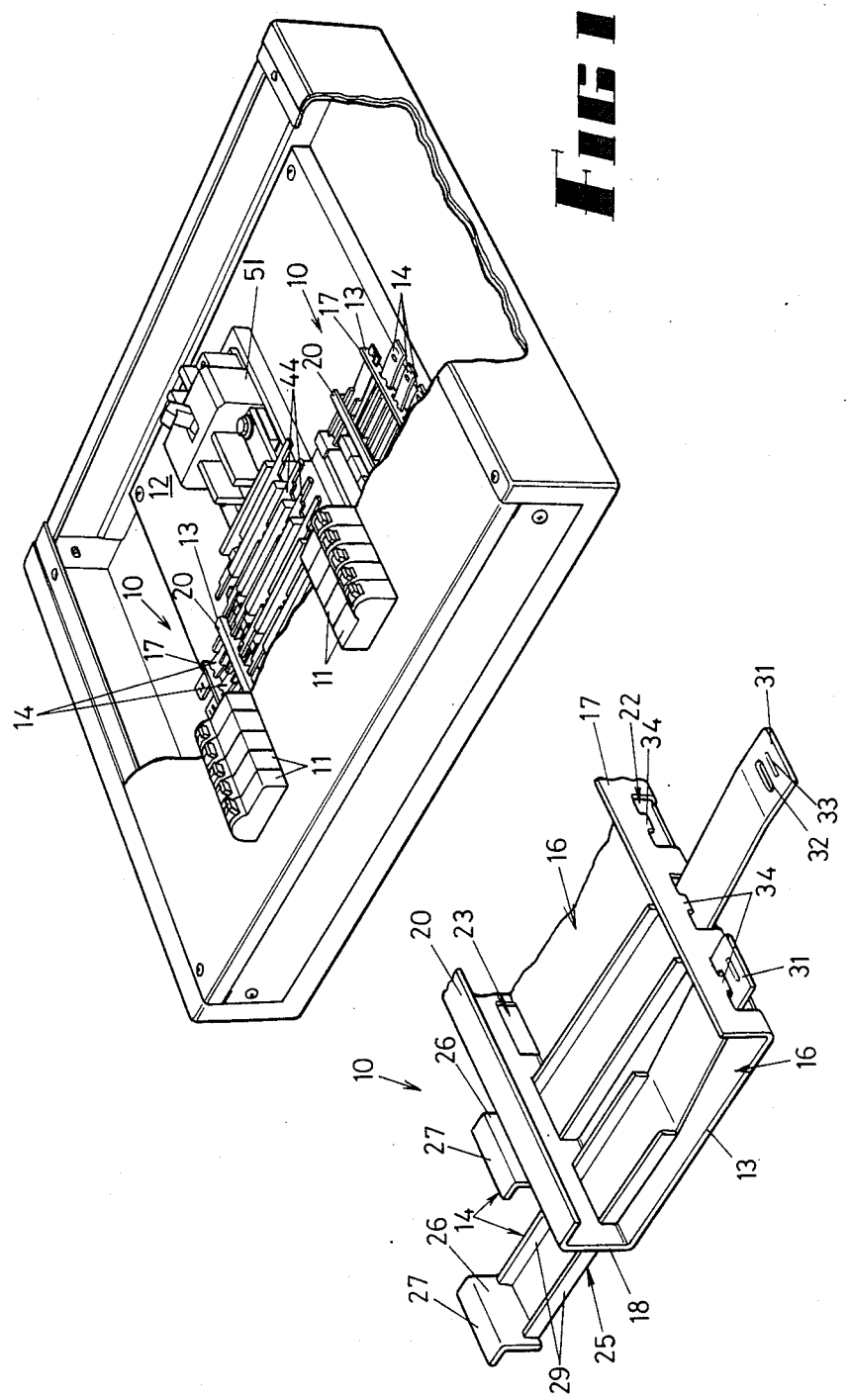

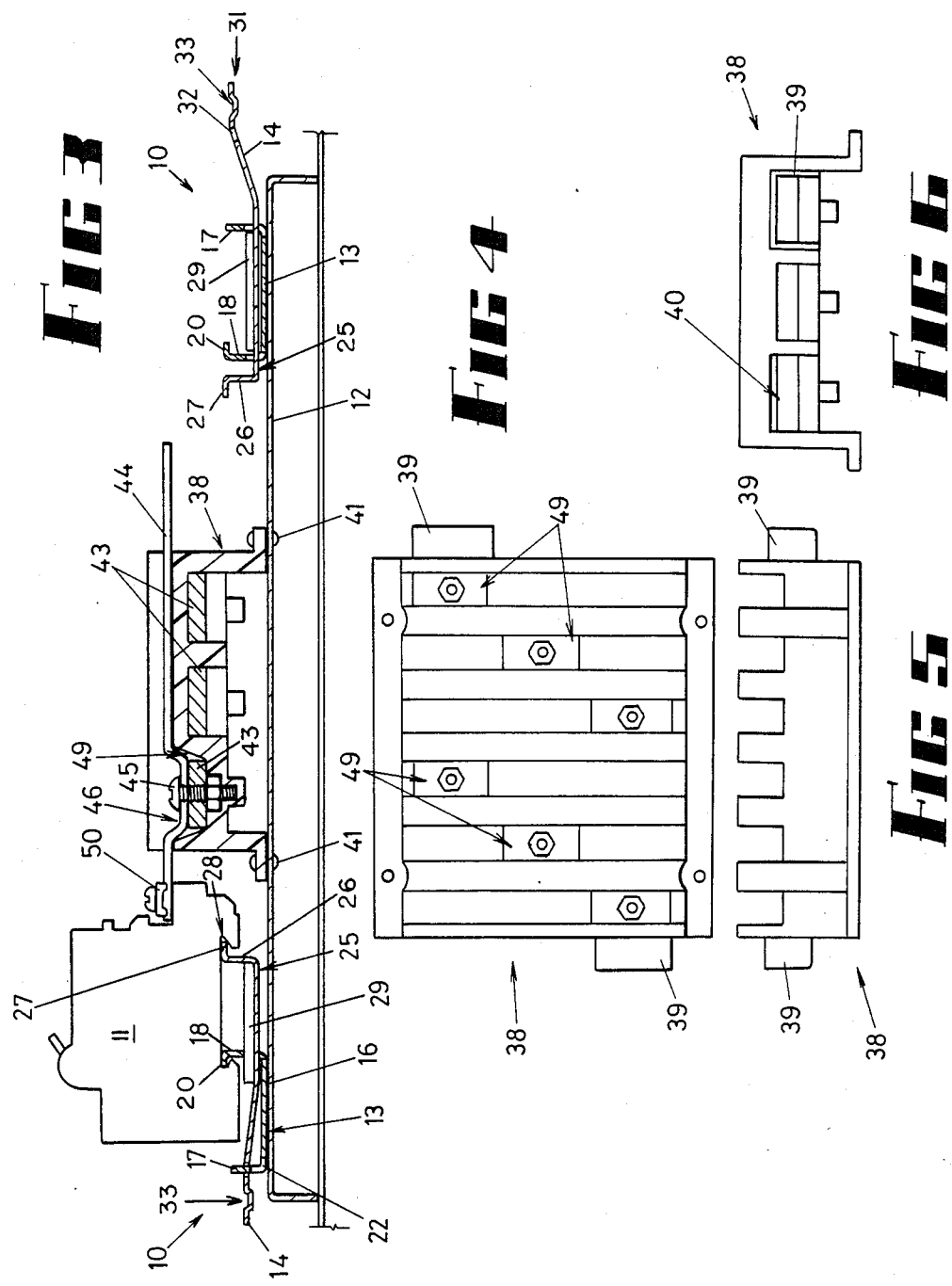

MOUNTING RAIL

BACKGROUND OF THE INVENTION

Circuit breakers, time clocks, relays and other electrical components are frequently mounted on mounting rails known in Europe and elsewhere as D.I.N. rails, and these rails retain the components in a simple manner, being arranged so that a single rail can support any one or a plurality of components having a standard mounting base.

D.I.N. rails are of general channel form, wherein the upstanding flanges have out-turned portions and these out-turned portions engage beneath re-entrant surfaces of the components to be mounted.

In "soft wiring" situations, the standard D.I.N. system is eminently suitable. For example a circuit breaker utilised with a D.I.N. system is provided with re-entrant surfaces of a moulding which are spaced from one another and comprise a first V-groove the surfaces of which engage over the out-turned portions of a flange, and a second V-groove which is between a movable latching member on the circuit breaker and a base surface thereof. By withdrawing the latch, the circuit breaker can be moved slightly to one side and then lifted off the mounting rail. However when the bus bars are used for mounting such elements, it is necessary for the bus bars to be bent in such a way that the circuit breaker moulding can be lifted away thereform vertically, and this is damaging and in some cases can result in breakage of the metal comprised in the bus bars.

In the Australian patent No. 511858 in the name of Brown Boveri there were disclosed certain improvements, but these did not avoid the above identified problem. In our Australian application No. 17866/83 there was disclosed a bus bar mounting which assisted in avoiding the problem of bending bus bars, and the arrangement disclosed therein is also disclosed generally in this specification.

The main object of this invention is to provide an improvement whereby the above identified difficulties are avoided, and therein it is feasible to mount an electrical component on a mounting rail but release the element with a minimum of damage to ancillary connections, for example bus bars.

BRIEF SUMMARY OF THE INVENTION

In one embodiment of this invention a mounting rail comprises a base having parallel upstanding flanges thereon each containing a plurality of apertures, one of the upstanding flanges having a return portion, and a latch strip which engages in a pair of transversely aligned apertures in respective flanges, the latch strip having a retaining flange which is engageable with mounting surfaces at one end of an electrical component when the other end engages the flange return portion of the upturned flange.

More specifically, a mounting rail for mounting electrical components having re-entrant surfaces comprises a base strip having a pair of upstanding longitudinal flanges parallel with one another. One flange extends along the forward edge of the base strip and the other, which is a mounting flange, extends along the rear edge thereof. A retaining portion extends along the mounting flange, and a plurality of apertures are provided in each flange, with transversely spaced pairs of apertures in respective flanges being in alignment. A plurality of latch strips extend transversely across the base, each strip being slidable in a respective pair of aligned apertures. Each latch strip also has a retaining portion and a latch device releasably retaining each latch strip to the base strip when the retaining portion thereof is so spaced from the mounting flange retaining portion that the spaced retaining portions retain an electrical component when engaging respective re-entrant surfaces of the component.

BRIEF DESCRIPTION OF THE DRAWINGS

An embodiment of the invention is described hereunder in some detail with reference to and is illustrated in, the accompanying drawings, in which FIG. 1 is a partly "broken" perspective view of a switchboard, FIG. 2 is a fragmentary view of the mounting rail, drawn to a larger scale, FIG. 3 is a cross-sectional view of a circuit breaker on the mounting rail, FIG. 4 is a plan view of a bus bar mounting block, FIG. 5 is a front elevation of FIG. 4, (FIGS. 4 and 5 being to the same scale as, but oriented by 90° from FIG. 3), and FIG. 6 is an side elevation of FIG. 5.

DETAILED DESCRIPTION OF THE INVENTION

Referring first to FIG. 1, mounting rail 10 for mounting circuit breakers 11 on a switchboard 12 comprises a base strip 13 and a plurality of latch strips 14.

The base strip 13 is formed from rigid sheet metal to have a base web 16, a longitudinally extending upstanding flange 17 along the rear edge of the base web, and a longitudinally extending mounting flange 18 along the forward edge (FIG. 2). The mounting flange 18 extends upwardly from the base web and has an inturned retaining flange portion 20 directed back towards the upstanding flange 17 along the other edge.

The upstanding flanges 17 and 18 of the base strip 13 are provided with a plurality of apertures respectively designated 22 and 23, the apertures being arranged in transversely aligned pairs. In each pair a respective latch strip 14 is slidable, each latch strip 14 having a portion 25 which extends forwardly of the base, and has an upstanding latch strip flange 26 with an out-turned retaining lip 27. The out-turned lip 27 also constitutes a retaining portion for the retaining of an electrical component, being engageable in a V-groove 28 in the base of a circuit breaker 11. Each latch strip 14 also has stiffening side flanges 29 which inhibit deflection of the forwardly extending portion 25.

Each latch strip 14 is formed from sheet metal having spring characteristics, and the end 31 which is distal from the upstanding flange 26 has both a latch slot 32 and a depression 33. The depression 33 is engageable by a tool, for example by a screwdriver, by which it can be depressed, and the latch slot 32 can then be removed from its engagement over a downturned tongue 34 (FIG. 2) which projects into latch slot 32 in the upstanding flange 17 of the base strip 13, allowing the strip to be withdrawn, and the circuit breaker to be removed by firstly sliding laterally away from a connector strip as described hereunder.

In order to retain the latch strips in position, each latch strip 14 has a shallow V formation such that the latch strip has the slotted end urged upwardly, and by resilience firmly engages the respective tongue 34 of the flange 17 of the base strip 13 (FIG. 2).

In use, the out-turned lips 27 of the upstanding flanges 26 of the latch strips 14 are coplanar with one another, and each one separately retains an electrical component (for example a circuit breaker 11) by engaging between the re-entrant surfaces defining V grooves 28 of the component. In some instances several strips perform this function, where for example a circuit breaker is a three phase circuit breaker which occupies considerable width.

The other retention means for the component is the retaining flange 20 of the base strip 13, and this engages return surfaces on the underside of the moulding of the component.

When it is required for example to replace a circuit breaker, or to install a circuit breaker or other element, the slotted end 31 of the pertinent latch strip 14 is depressed so as to release (i.e. unlatch it) from the downturned tongue 34 of the flange 17 of the base strip 13, and the latch strip 14 is withdrawn in a rearward direction, moving it towards the mounting flange 18. This reduces the space between the retaining means 20 and 27 (as shown at the right hand side of FIG. 3) so that the circuit breaker 11 is released from retention. If the circuit breaker is associated with a bus bar, the bus bar is released, and the circuit breaker can be moved in a direction away from the bus bar and then simply lifted away from the mounting rail. The same arrangement however can also be utilised for "soft wiring" of any element, and the configuration avoids the need for latching means on the elements, thereby substantially reducing the overall installation cost.

FIGS. 3 to 6 show a typical bus bar arrangement, wherein a plurality of connector strip mounting blocks 38 are capable of being interconnected end to end by channel section spigots 39 which engage in sockets 40 of adjacent blocks. Mounting blocks 38 are secured to the switch board 12, for example by fasteners 41 (FIG. 3).

Relatively wide bus bars 43 extend longitudinally through the blocks, and are connected to relatively narrow connector strips 44 by screw fasteners 45 (FIG. 3). Phases are separated by the material of blocks 38 which separate the bus bars 43, and also overlie them as shown in FIG. 3. However, each block 38 contains spaced recesses 49 (FIG. 4), and each connector strip 44 has a downwardly formed portion 46 in a said recess and the connection to its bus bar 43 is thereby only at the locality of that recess. Electrical connectors 50 join the strips 44 to their respective circuit breakers 11. Since the circuit breaker 11 is withdrawn by moving it towards flange 17 of base strip 13, it is also withdrawn away from strip 44, which therefore does not need to be disturbed. Isolating switch 51 (FIG. 1) isolates all the bus bars 43, when it is open.

What is claimed is:

1. A mounting rail for mounting of electrical components on a switchboard, wherein each component is provided in its base with re-entrant surfaces spaced from one another, comprising:
   a base strip having a pair of upstanding longitudinal flanges parallel with one another, one flange extending along the rear edge of the base strip and the other, being a mounting flange, extending along the forward edge of the base strip, said mounting flange having an inturned flange retaining portion, a respective plurality of apertures in each said flange, transversely spaced pairs of said apertures in respective said flanges being in transverse alignment with one another,
   a plurality of latch strips extending transversely across the base strip, each said latch strip being slidable in a respective pair of said aligned apertures in said flanges, a retaining lip portion on each respective said latch strip, each said latch strip also having a retaining latch slot for releasable engagement by the base strip, the retaining lip portion being spaced from said mounting flange retaining portion when the latch slot is engaged by the base strip, the respective spaced retaining portions of the latch strip and mounting flange comprising means for engaging respective re-entrant surfaces of an electrical component to retain the component.

2. A mounting rail according to claim 1 wherein said mounting flange retaining portion projects from the mounting flange rearwardly in a direction away from the latch strip retaining lip,
   and said latch strip has a latch strip flange on a forward end of the latch strip, the latch strip retaining lip portion projecting forwardly from the latch strip flange in a direction away from said mounting flange retaining portion.

3. A mounting rail according to claim 2 wherein said base strip rear flange has tongues projecting downwardly into respective rear flange apertures, and wherein said latch strips are metal springs having front and rear ends, and the rear end of each latch strip contains said latch slot which engages over a respective said tongue to releasably retain said latch strip, said latch strip being disengageable from said tongue by resilient deflection of said latch strip rear end.

4. A mounting rail according to claim 1 wherein each said latch strip has stiffening side flanges which extend for part way only of its length.

5. A mounting rail according to claim 4 wherein the base strip is formed from sheet metal of constant thickness, and each said latch strip is formed from sheet spring metal also of constant thickness.

6. A switchboard having a support block thereon, bus bar and connector strips carried by the support block, a plurality of circuit breakers each having a base defining spaced re-entrant surfaces, electrical connectors joining the circuit breakers to respective connector strips;
   a mounting rail for releasably mounting said circuit breakers, said mounting rail comprising a base strip having a pair of upstanding longitudinal flanges parallel with one another, one flange extending along the forward edge of the base strip and the other flange comprising a mounting flange extending along the rear edge of the base strip, a retaining portion extending along said mounting flange, a plurality of apertures in each said flange, transversely spaced pairs of said apertures in respective said flanges being in transverse alignment,
   a plurality of latch strips extending transversely across the base strip and each being slidable in a said pair of aligned apertures in said flanges, each said latch strip also having a retaining portion, and latch means for releaseably retaining each said latch strip to said base strip in a latching position of said latch strip, said latch strip and mounting flange retaining portions being spaced from one another in said latching position and comprising means for engaging respective spaced re-entrant surfaces of a circuit breaker to releasably retain said circuit breaker on said base strip, each said circuit breaker being secured to respective spaced retaining portions of said mounting flange and a respective one of said latch strips but, upon unlatching and withdrawal of its latch strip in a rearward direction, being laterally withdrawable from both said mounting rail and said connector strip.

* * * * *